US011227246B2

(12) United States Patent
Albert et al.

(10) Patent No.: US 11,227,246 B2
(45) Date of Patent: Jan. 18, 2022

(54) SYSTEMS AND METHODS FOR IDENTIFYING, PROFILING AND GENERATING A GRAPHICAL USER INTERFACE DISPLAYING CYBER, OPERATIONAL, AND GEOGRAPHIC RISK

(71) Applicants: Tom Albert, Hamilton, VA (US); Michael Vien, Dallas, TX (US)

(72) Inventors: Tom Albert, Hamilton, VA (US); Michael Vien, Dallas, TX (US)

( * ) Notice: Subject to any disclaimer, the term of this patent is extended or adjusted under 35 U.S.C. 154(b) by 0 days.

(21) Appl. No.: 16/145,065

(22) Filed: Sep. 27, 2018

(65) Prior Publication Data

US 2019/0102714 A1    Apr. 4, 2019

Related U.S. Application Data

(60) Provisional application No. 62/566,128, filed on Sep. 29, 2017.

(51) Int. Cl.
| | |
|---|---|
| *G06Q 10/06* | (2012.01) |
| *G06N 7/00* | (2006.01) |
| *H04L 29/08* | (2006.01) |
| *G06F 8/38* | (2018.01) |

(52) U.S. Cl.
CPC .......... *G06Q 10/0635* (2013.01); *G06F 8/38* (2013.01); *G06N 7/005* (2013.01); *H04L 67/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,050,959 | B1 * | 11/2011 | Erdman | G06Q 10/06 705/7.28 |
| 2004/0172317 | A1 * | 9/2004 | Davis | G06Q 10/06395 705/80 |
| 2005/0071217 | A1 * | 3/2005 | Hoogs | G06Q 10/0635 705/7.28 |
| 2010/0205108 | A1 * | 8/2010 | Mun | G06Q 40/06 705/36 R |
| 2011/0078073 | A1 * | 3/2011 | Annappindi | G06Q 40/025 705/38 |
| 2015/0161620 | A1 * | 6/2015 | Christner | G06Q 30/0185 705/318 |

* cited by examiner

*Primary Examiner* — Arif Ullah
(74) *Attorney, Agent, or Firm* — Attentive Law; Paul Ratcliffe

(57) ABSTRACT

Methods and apparatus consistent with the invention provide the ability to combine data from multiple different sources of risk data, to create a weighted risk model using Bayesian networks and Monte-Carlo simulation to advance a quantified risk outlook. Based on the client risk configuration file, a risk user interface (UI) template is selected and the modelled risk is generated into a graphical user interface (GUI) using the selected risk template to display the GUI at multiple summary levels starting at a high-level overview which will include cyber, economic, legal, brand, operational and geographic risks. The GUI of modelled risk is displayed on the client device using the selected UI template. The system enables the user to drill down into the GUI for any of the categories available in the selected UI template to further examine risk characteristics as well as the actual sources of the risk in the modelled risk.

3 Claims, 11 Drawing Sheets

121 dark web data collector (see Fig. 1)

SYSTEMS AND METHODS FOR IDENTIFYING, PROFILING AND GENERATING A GRAPHICAL USER INTERFACE DISPLAYING CYBER, OPERATIONAL, AND GEOGRAPHIC RISK

RELATED APPLICATION

This application claims priority to and the benefit of U.S. Provisional Patent Application 62/566,128, filed on Sep. 29, 2017, entitled: "Systems and Methods for Identifying, Profiling and Displaying Cyber, Operational, and Geographic Risk", the entirety of which is incorporated herein by reference.

FIELD OF THE INVENTION

This invention relates to the field of determining risk and modelling risks faced by businesses.

More specifically this invention is a method of determining and modelling risk based on many different sources, modelling and summarizing this risk so that it may be easily understood at a high level. It will also retain and display how the risk was modelled so that it can be understood at a lower level and mitigated if possible. The invention also allows an organization to compare their risk to the risk level of other organizations within the same vertical or across verticals.

The determination and modelling of risk is achieved by collecting risk from many different sources including private sources, dark web sources, open source sources, through partnerships with other data collectors, analyst driven sources and integrations with established in house data repositories.

The risk model can then be tuned to reflect the needs and risks facing an individual company. This will be enabled by the creation of risk templates that can be applied to a company based on their vertical or industry and the geographic locations and structure of the company.

BACKGROUND OF THE INVENTION

Currently businesses have many different methods of measuring and modeling risk. Unfortunately, no tool currently collects the broad information and collates the risk posed to a company from Cyber, Economic, Legal, Brand, Operational and Geographic Risk Sources. The most commonly used methods of modelling risk build statistical models from past data and attempt to extrapolate this into the future. This risk modeling approach is inadequate when modelling risk from rare events such as cyber-attacks since there is generally not enough relevant historical data. Another approach using "risk registers" is better but fails to provide a proper measure of the risk. Neither of these two approaches are able to model dependencies between different risk factors.

Also, the tools that exist while specific are also quite technical in their presentation thus limiting their audience to those technically minded members of an organization.

This means that it is impossible for an organization to get a clear and fact based picture of their combined risk without significant additional technical and significant human work and even then it is not in an easily digestible form.

SUMMARY OF INVENTION

This invention relates to the field of determining risk and modelling risks faced by businesses.

One embodiment of the invention comprises both a Bayesian modelling component and a user interface for modelling risk and displaying the risk model to an end user.

One embodiment of the invention employs Bayesian networks (also known as causal probabilistic models) to model complex interdependencies between risk factors, and as such, can combine disparate sources of data into a risk model that provides real decision support for managing and mitigating risk.

One embodiment of the invention presents a multilayer user interface to the end user in which both summaries if risk and detailed descriptions of the risk sources can be investigated.

One embodiment of the invention allows the user to compare and contrast their risk with other organizations either in the same or across verticals.

The invention allows the user to create a risk model that is tailored to their needs, either by creating a risk model from scratch or by tweaking and or combining templates that include templates by vertical/industry and geographic locations.

The invention continually collects data from a broad spectrum of disparate sources including but not limited to; the dark web; open source intelligence sources; proprietary data sources; internal business intelligence sources; and user driven sources.

This data collected and collated against many different Key Risk Indicators (KRIs) across 8 main categories: Geographic Risk, Economic Risk, Legal Risk, Brand Risk, Operational Risk, Infrastructure Risk, Insider Risk and Proficiency. Each of these categories is further broken down into individual risk areas.

Data for any KRI may be collected from any data source, and there may be overlaps between different risk areas with the same data. This is expected as a company may rate different risks as having different importance. So, the same data may drive different risk ratings depending on the KRI that is being measured.

The Bayesian model of the risk posed by these KRIs can be modeled as a dynamic risk tree with a Bayesian network. The interaction of these risks can be configurable via a specialized UI.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF EXEMPLARY EMBODIMENTS

The present invention can be more fully understood by reading the following detailed description together with the accompanying drawings, in which like reference indicators are used to designate like elements, and in which:

Hereinafter, aspects of the present inventions processing and associated systems in accordance with various embodiments of the invention will be described. As used herein, any term in the singular may be interpreted to be in the plural, and alternatively, any term in the plural may be interpreted to be in the singular. As used herein, "customer" and "user" have been used interchangeably, as a user may constitute a customer.

Figure 1:
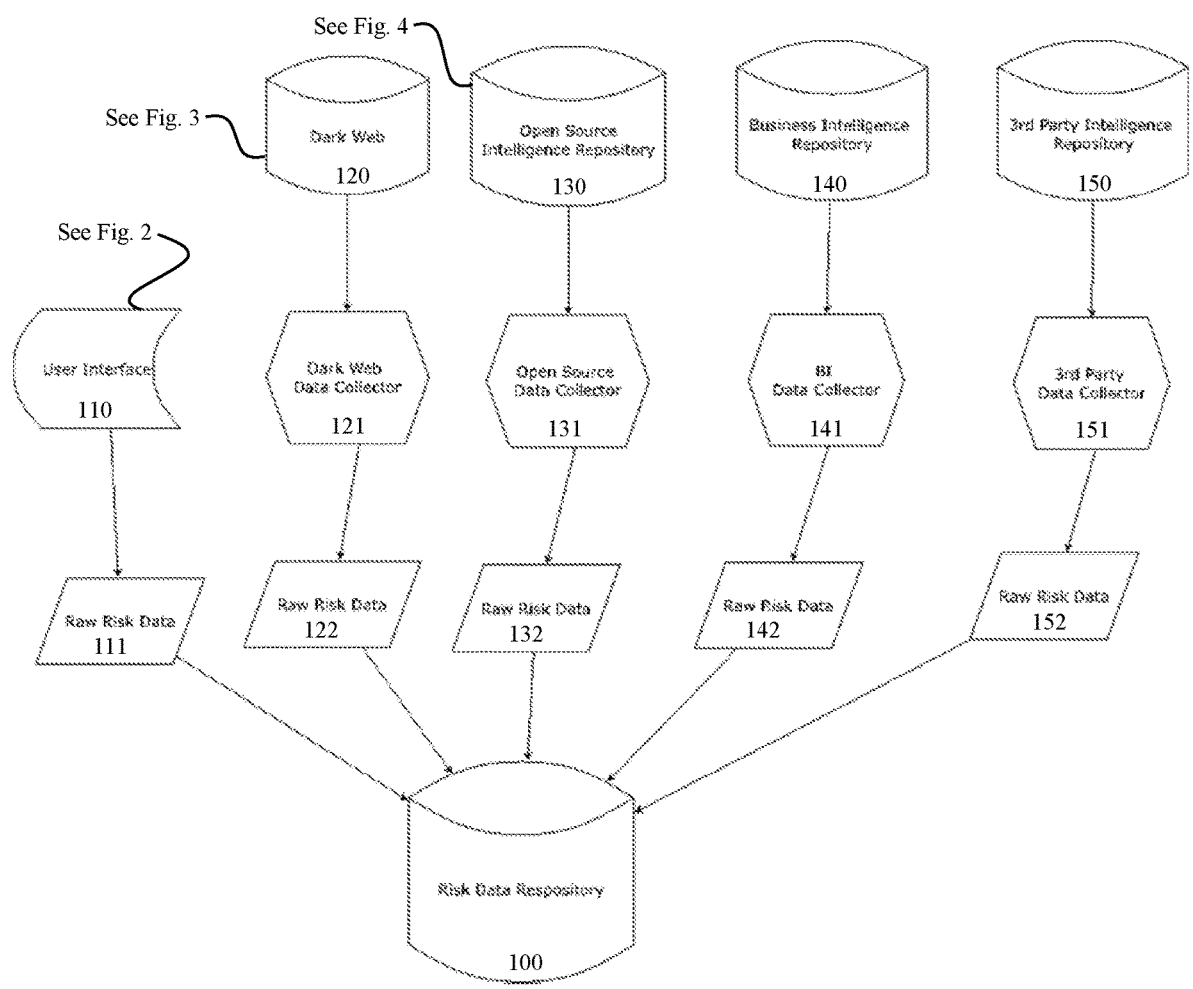
FIG. 1 is a flow diagram indicating the sources of information that are provided or obtained.

As seen in FIG. 1, the system incorporates data collection from various sources for inclusion in a raw data repository 100. Analysts using the user interface 110 may input various risk and geographic data into the interface 110 which becomes part of the raw risk data 111. Such raw risk data 111 is included in the raw risk data repository 100. In addition, the dark web 120 is also searched via a dark web data collector 121, as described further below with reference to FIG. 3. The dark web data collector 121 may comprise various crawlers and other known techniques for accumulating the dark web 120 data. The data from the numerous dark web 120 locations is collected and put into the raw dark web risk data 122 which is included in the risk data repository 100. In addition, open source intelligence repository data 130 is also collected for use by the system, as described further below with reference to FIG. 4. The open source intelligence repository 130 may include many open websites; various other related accessible data and content which may include things like Facebook, Twitter, Wikipedia, and news agencies. The open source data collector 131 collects the open source data 130 and transforms it into the raw risk data for open source information 132. The raw risk data 132 is included in the risk data repository 100.

The system may also obtain business intelligence data from the business intelligence repository 140 as collected by the business intelligence (BI) data collector 141. The business intelligence data from various sources forms the business intelligence raw risk data 142, which is included in the risk data repository 100. Further, third party intelligence data may be used that identifies various third party intelligence repositories 150 of which the third party data collector 151 is used to collect the third party intelligence data 150. Combined third party data is collected into the third party intelligence raw risk data 152, which is part of the risk data repository 100, as shown in FIG. 1. It is important to note that the various data collection mechanisms may use one or more techniques to transform the raw risk data, 111, 122, 132, 142, and 152. The raw risk data may be normalized for easier use within the risk data repository 100. Once the raw risk data 111, 122, 132, 142, 152 is accumulated, and if needed or desired normalized, the data is stored in memory within the system. Such memory may be local memory to a privatized or secured machine. Alternatively, or additionally, such memory may be stored on one or more servers or cloud devices.

The present invention, as seen in FIG. 1, demonstrates how risk from many different and diverse sources is combined to create the data repository for risk modelling. The date may be combined with geographic location or area that is relevant to the data, which then allows the narrowing of risk by geo location.

The user interface 110 (FIG. 1) is used by key business personnel to enter additional related risk data that cannot be automatically scraped or collected from other means. This data may include risk that requires analyst review and analysis, and data that is collected by physical inspection or interview. This data is entered via the user interface 110 so that it can become raw risk data to build and/or further refine the Bayesian risk model. The data collectors gather data from many different sources and transform this data into raw risk data across multiple KRIs to build the Bayesian model, in accordance with one embodiment of the invention.

Figure 2:
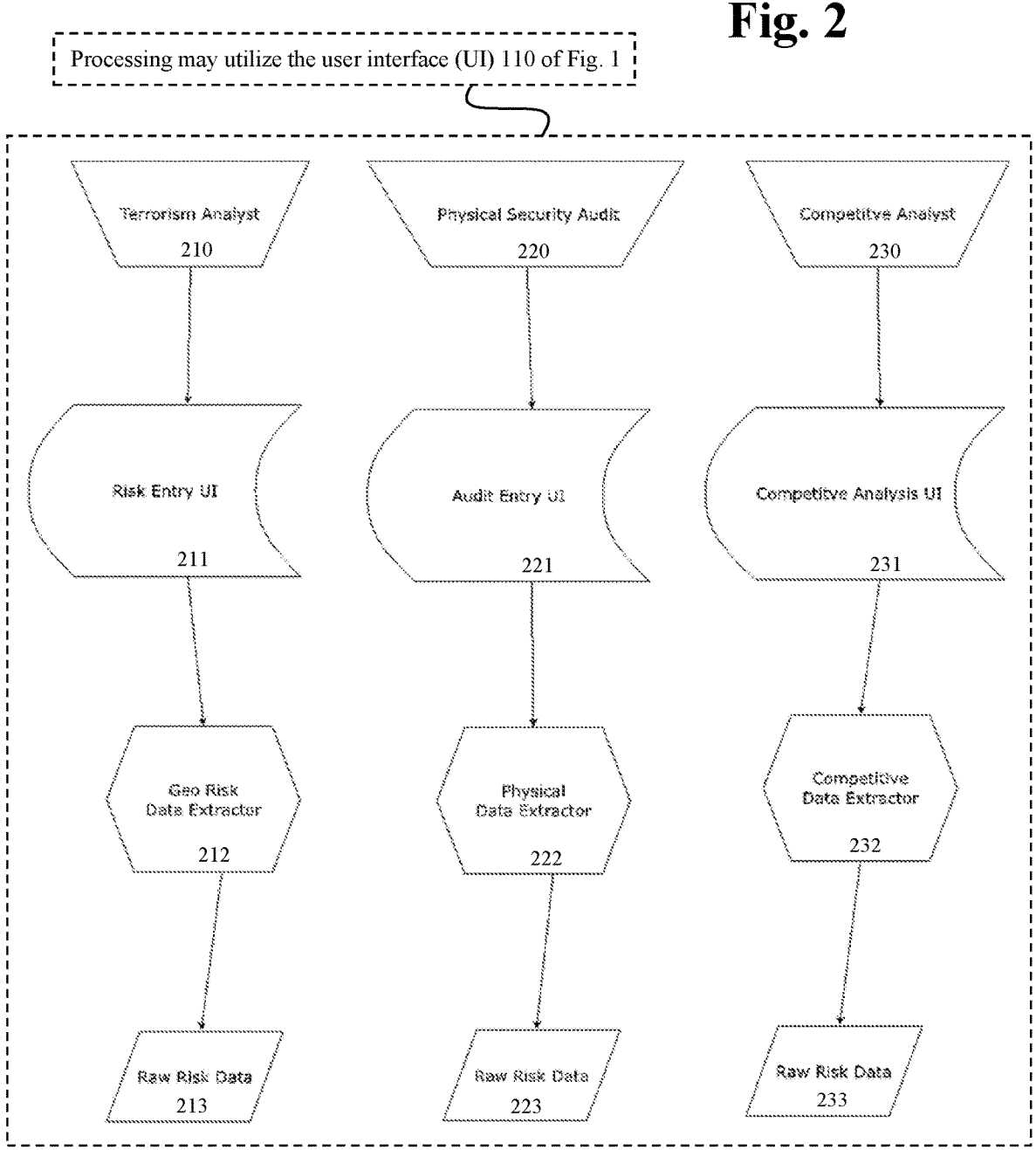
FIG. 2 is a flow diagram of the analyst entered risk data.

FIG. 2 provides a further breakout of the process flow related to the user interface processing for a collection of risk data, in accordance with one embodiment of the invention. Often times, analysts may be used to collect and enter data from research and/or events on which they are reporting. Specifically, there may be a terrorism analyst 210 who enters information into the risk entry user interface 211. The terrorism risk data is then extracted using the georisk data extractor 212 to accumulate the terrorism raw risk data 213 as part of the repository previously described. A physical security audit 220 of an installation or customer may be entered into an audit entry user interface 221. The physical security audit data is extracted by the extractor 222 to produce the physical security raw risk data 223. Finally, an analyst may review competitive information 230 related to that customer's competitor's risk profile and risk information. The information is input into the competitive analysis user interface 231. The competitive data extractor 232 extracts the data as entered by the analyst 230 to produce the competitive raw risk data 233. Again, the raw risk data 213, 223, 233 may be normalized for inclusion in a larger risk data repository (see 100 of FIG. 1).

FIG. 2 shows how data that is not automatable can be collected from various specialists or post audit sources—and entered into the system where such data will be transformed into consumable raw risk data. A terrorism analyst 210 may enter data into a geographic risk UI (user interface) that allows the analyst to rate the risk of terrorism by geographic area. After a physical security audit 220, the results can be uploaded and the raw physical risk data 223 can be extracted. An analyst (who performs analysis on the competitive landscape) can enter what she/he perceives the risks to an organization to be from the perspective of their competitors.

Figure 3:
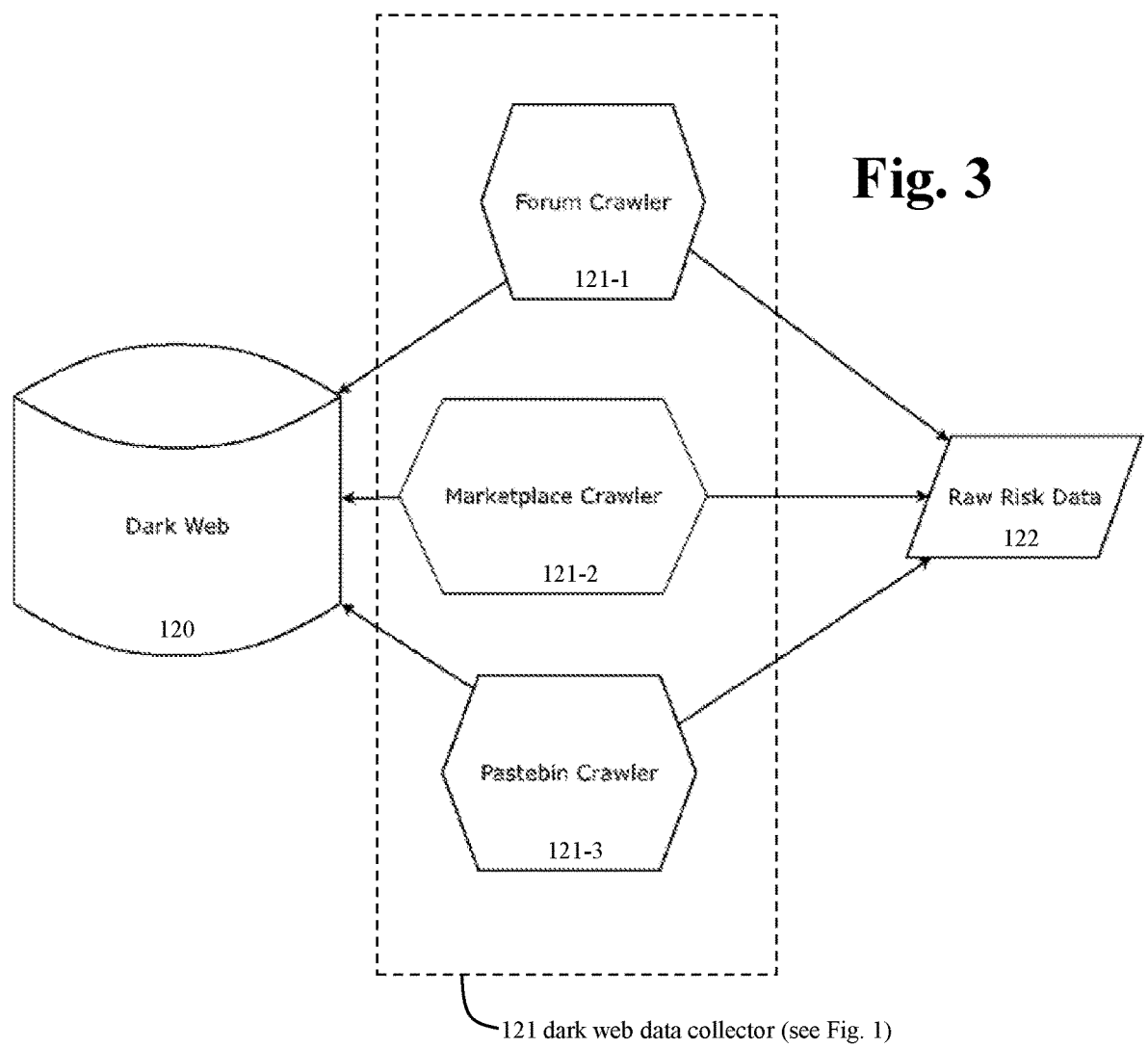
FIG. 3 is a flow diagram of the dark web risk data flow.

As seen in FIG. 3 and as previously discussed with regard to FIG. 1, the dark web 120 is crawled for various information relevant to risk. The dark web data collector 121 (as also shown in FIG. 1) may include a forum crawler 121-1 which crawls one or more forums, a marketplace crawler 121-2 for crawling marketplaces and websites selling items or information, and a pay spin crawler 121-3. The various crawlers 121-1, 121-2, 121-3 crawl the dark web 120 accumulating various dark web raw risk data 122. The raw risk data 122 may be normalized and included in the risk data repository 100.

Accordingly, FIG. 3 shows several possible different dark web data crawlers that may extract data from different types of dark web sites to become the raw risk data 122. For example, if a company, persons associated with a company (such as company executives), products associated with a company, or assets associated with a company are mentioned on dark web forums this may be indicative of a possible upcoming attack or brand disparagement, or other threatening event.

If a company's goods are being counterfeited and sold on dark web marketplaces that is also translatable back to risk posed to a company's brand, overall profitability, and other assets of the company. For example, paste bins (a type of web application where persons can store plain text and allow comments to be exchanged) often contain the results of leaks or breaches of company data, a clear risk to an organization.

Figure 4:
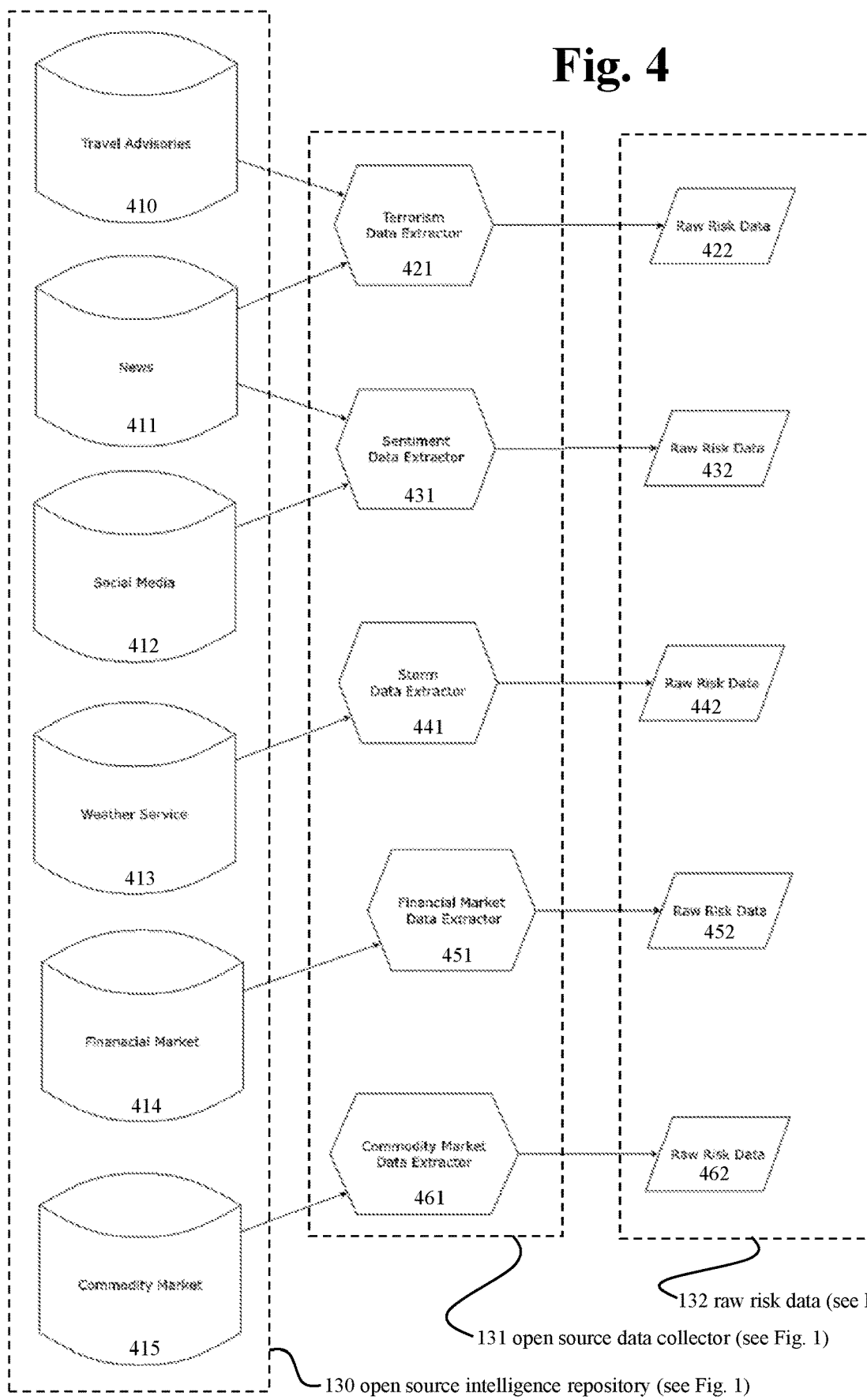
FIG. 4 is a flow diagram of the open source risk information.

FIG. 4 corresponds to the open source intelligence repository 130 as seen in FIG. 1, in accordance with one embodiment of the invention. Various types of open source data may be reviewed and crawled for use by the present invention. Such sources may include but are not limited to travel advisories 410, news 411, social media 412, weather service 413, financial markets 414 and commodity market information 415.

Various extractors (as represented by the open source data collector 131 of FIG. 1) may be used to pull the information from the open source data. A terrorism data extractor 421 may be used to crawl various sources such as travel advisory information 410, news sources 411. Although FIG. 4 does not show the terrorism data extractor 421 obtaining information or pulling information from all of the sources, the terrorism data extractor 421 may pull or crawl and obtain information from any one of the sources identified. The terrorism data extractor then culls the information resulting in the terrorism raw risk data 422. Similarly, the sentiment data extractor 431 may pull from one or more of the sources 410, 411, 412, 413, 414, 415. Ultimately resulting in sentiment raw risk data 432. The storm data extractor 441 may pull information from the various sources although it is anticipated that it will primarily be the weather service 413 and news source 411 resulting in storm or weather related raw risk data 442. Financial market data extractor 451 may pull information from the various sources including the financial market 414 as well as other sources to provide the financial market raw risk data 452. The commodity market data extractor 461 may pull information from one or more sources including the commodity market sources 415 resulting in the commodity market raw risk data 462. The sentiment data extractor 431, as well as the other data extractors may tag the data—as it is being extracted—as a negative or positive sentiment. The various crawlers 121-1, 121-2, 121-3 may use the search engines semantic tools as well as reviewing trading platforms and other relevant sources.

Accordingly, FIG. 4 shows how data can be collected and combined from open source data sources to create raw risk data 132. For example, the travel advisories 410 supplied by the US government at https://travel.state.gov/content/passports/en/alertswarnings.html can be consumed (along with news reports) to create a risk data relating to terrorism by geographic area. Data from news sources 411 and social media 412 can be collected and combined to create raw risk data that pertains to the global or local sentiment toward a brand or company. Data from a weather service 413 may be collected to create raw risk data that relates to weather related events such as storms and flooding. Data from financial markets 414 can be collected to create raw risk data that relates to financial events such as stock volatility. Further, data from commodity markets 415 can be collected to create raw risk data that relates to raw material costs and/or transport.

Figure 5:
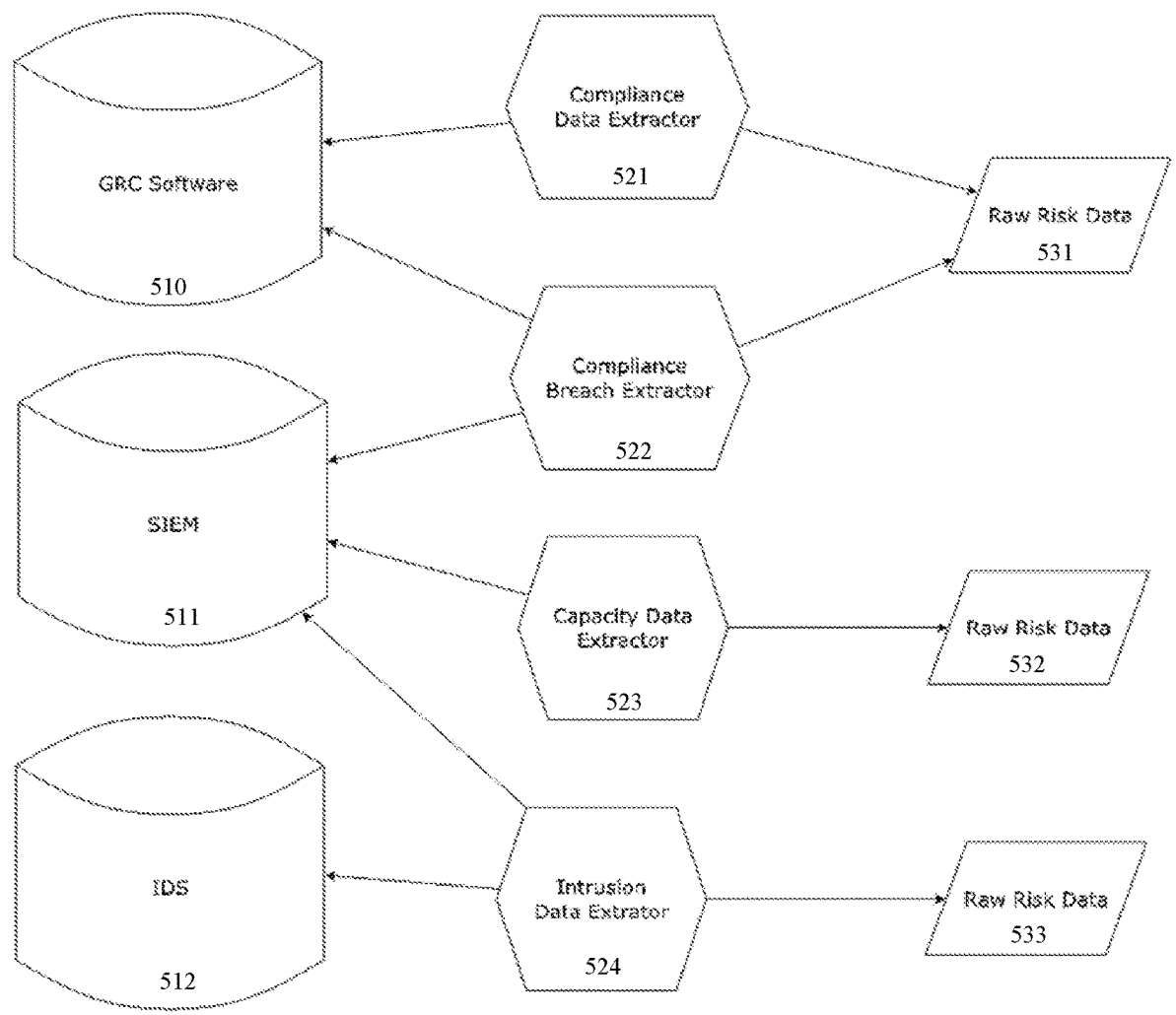
FIG. 5 is a flow diagram of the business intelligence data.

FIG. 5 provides an illustration of how the Business Intelligence (BI) crawlers can extract data from various different existing business intelligence applications within an organization. Such information is extracted and transformed into raw risk data 531, 532, 533 according to the type of data. Such data can be used to build the Bayesian model used by the system of the present invention. The lack of availability of these data sources can be a risk data point in and of themselves. By way of example, the follow data sources may be used: (1) Compliance Data can be extracted from the governance, risk management, and compliance (GRC) software 510 that a company is running by the compliance data extractor 521 and transformed into raw risk data 531; (2) compliance breach risk may be able to be extracted by looking at security information and event management (SIEM) 511 application output in addition to querying the GRC software 510, the compliance breach extractor 522 extracts the SIEM 511 and GRC software 510 data and transforms the information into raw risk data 531 and 532; (3) capacity data may be extracted by querying the SIEM 511 with the capacity data extractor 523 and transformed into raw risk data 532; and (4) Intrusion Risk data can be extracted by querying the intrusion detection system (IDS) 512 and the SIEM 511 with the intrusion data extractor 524, which transforms the information into raw risk data 533.

Figure 6:
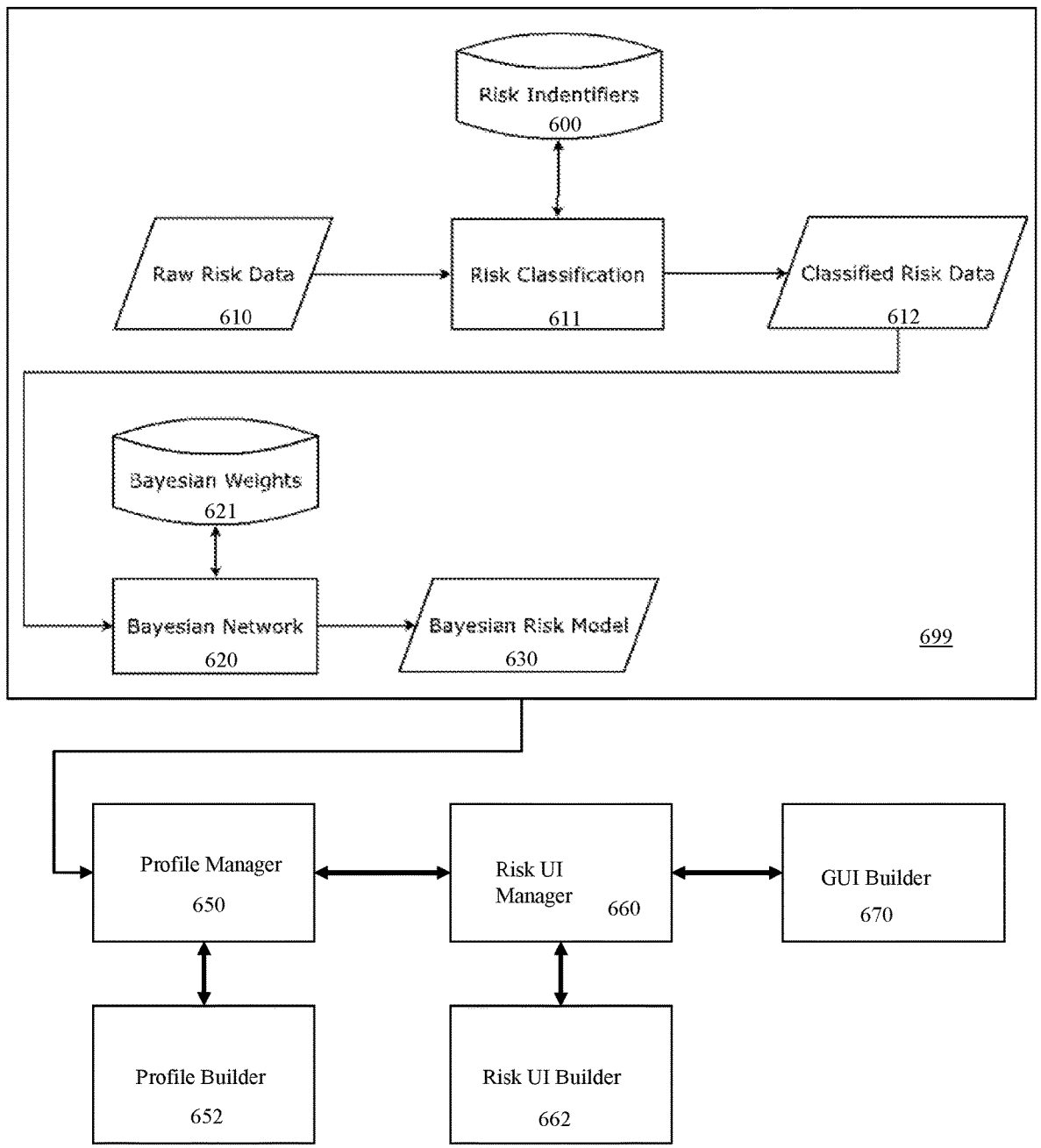
FIG. 6 is a flow diagram of the risk classification and weighting process.

As seen in FIG. 6, the present invention transforms raw risk data 610 to become part of the Bayesian risk model 630 in the risk model analysis process 699. For example, if the Raw Risk Data 610 was information on an organization's internet addressable services, then the Risk Identifiers 600 may identify risk based on vulnerable services or outdated services, or services that are typically not exposed to the internet, and assign risk classification 611. This will then result in classified risk data 612 along the KRI (key risk indicators). The failures that can result from this risk can be weighted using Bayesian weights 621 and combined on a company by company basis. This can then be used to build the Bayesian network 620 and model the risk accordingly. The data from risk model analysis process 699 is transferred to the profile manager 650, who communicates the information to the profile builder 652 and the risk UI manager 660. The risk UI manager 660 further communicates the information to the risk UI builder 662 and the GUI builder 670.

Figure 7:
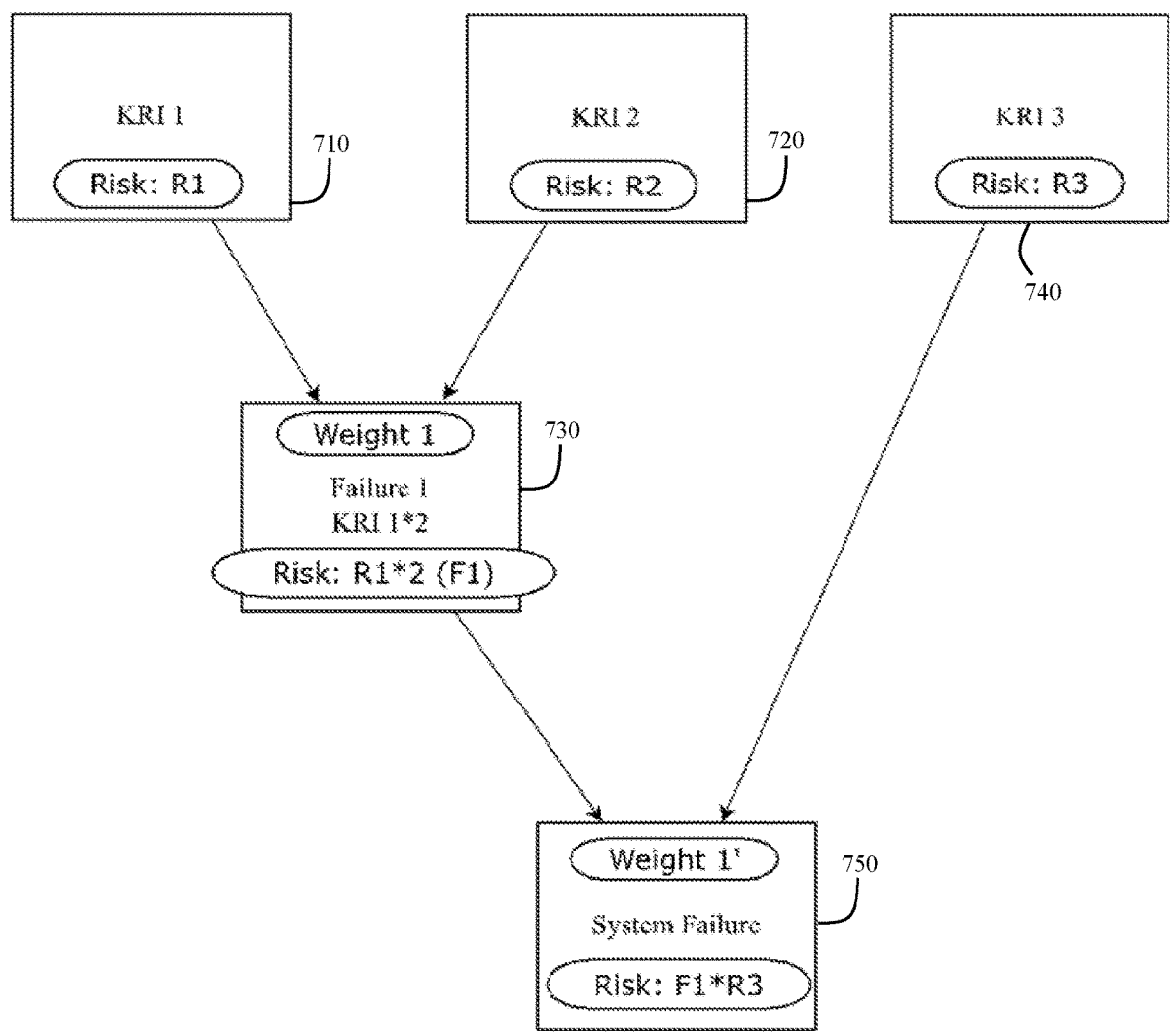
FIG. 7 is a flow diagram of the risk weighting logic.

The present invention, as seen in FIG. 7, employs a risk tree model such as a Bayesian network 620. For example, the model may use three (3) risks that result in two failure situations. Failure 1 730 only happens if the risks represented by KRI 1 710 and KRI 2 720 are realized and the system failure 750 can only happen if failure 1 730 has occurred and the risk represented by KRI 3 740 is realized. For example, KRI 1 710 may be the risk to a data center posed by natural disaster and KRI 2 720 may be the risk due to the delay of replication of data across multiple data centers. Failure 1 730 could represent loss of data due to loss of a data center to natural disasters such as a hurricane or wildfire combined with the delay of the replication of that data. KRI 3 740 may represent the risk that if data is lost a critical application will crash. Therefore, the system failure 750 event will only happen if all risks are realized. In reality the risk models will be far more complex and contain far more KRIs than this tiny example.

The graphical user interface of the system could allow a user to model this risk by joining KRIs together with failure conditions and assigning weights to these failures to highlight how important these failures would be to the company. For example, Failure 1 730 may not be very important but the System Failure 750 would be critical.

Figure 8:
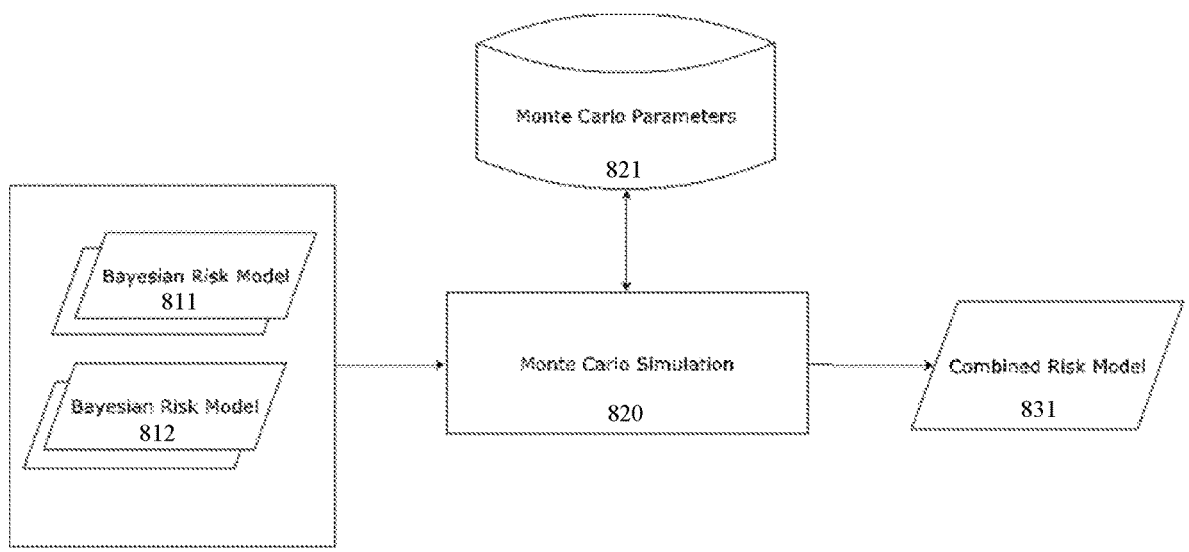
FIG. 8 is a flow diagram of the risk simulation method.

As seen in FIG. 8, once the one or more Bayesian risk models 811, 812 have been created, as shown in FIG. 7, the Monte-Carlo simulation 820 can be applied to determine the risk score. This will be done by performing Monte-Carlo modelling at each KRI and then filtering the results down through the threat tree of the system. The user may choose the correct distributions when setting the Monte Carlo Parameters 821 and modelling these distributions will be user configurable. Once one or more Bayesian risk modules 811, 812 have been created the Monte Carlo simulation 820 works within the configured Monte Carlo Parameters 821 to create a combined risk model 831 for the user.

Once the combined risk model 831 is determined, and referring back to FIG. 6, the risk user interface manager 660 can select the appropriate risk user interface template, from the risk UI templates available or through the risk UI builder 662, based on the risk model and the profile of the user or client from the profile manager 650, to generate and present user interface 110 (see FIG. 1). The risk user interface template manager 660 works with a client or user profile manager 650 to determine the most accurate graphical user interface (GUI) template. The profile manager 650 utilizes and defines a client's business profile, which includes many areas of managed user data for classifying appearance, perception of relevancy, level or layers of risk to include, and structure and location of business or client and their associated risk.

The system also includes a profile manager 650, a profile manager builder 652, a user interface risk template manager 660, and a user interface risk template builder 662. The system works with the user, client, or business configuration profile to identify various business risk aspects of the client and the profile of the user or client based on those various aspects of the client's business sectors and locations.

The system can use multiple configuration profiles which are available to the profile manager 650 for use in the application based on the determination, by the profile manager 650, of the configuration profile most likely to represent the real time risk analysis needs of the recipient. In the event the configuration profiles available to the profile manager 650 are not an appropriate profile for the determined profile of the recipient for the time that the risk assessment is prepared, the profile manager builder 652 can create a real-time risk profile based on the known elements of a recipient profile and filling in any determined gaps to build a new client risk configuration profile that would also then be stored and managed by the profile manager 650. Ultimately, the selected configuration profile or a new profile built by the profile manager builder 652 will be used to determine a final configuration profile which is then used by the risk user interface template manager 660 to determine which user interface to present to the client. For example, if the system determines an initial GUI template is appropriate, but the risk model identifies a new risk which is not accommodated in the GUI template, the system can select or build, using GUI builder 670, a new client risk profile, select or build a new GUI template, and then generate a GUI with the appropriate risk information and graphics to transmit and display on the user device while storing the new client risk profile, the new GUI template, and the end GUI data and image.

More specifically, the risk user interface template manager 660 includes one or more graphic and data builders or components which help the system determine an appropriate user interface from the existing user interface forms or templates from the UI Forms database or to adapt or build a new user interface more appropriate to the real time risk profile of the recipient. Understandable, different recipients may have different access to data components which would also be factored into the data and images available to such recipient which would impact the select UI template and resulting GUI produced by the system. The risk user interface template manager 660 determines if any of the UI forms are appropriate based on the profile determined by the profile manager 650. In the event the UI forms are deemed insufficient, the risk user interface manager 660 determines if the user interface can be adapted or controlled to create a user interface appropriate for the configuration profile or if a new user interface is required to be built by the risk user interface builder 662. Ultimately, a selected, adapted, or built graphical user interface is assembled or built by the GUI builder 670 and is transmitted and presented to the client. Different configuration profiles will result in different user interfaces templates presented to the client. Depending on the client profile, different user interface components may be hidden, rearranged, or replaced with different UI components. For example, the UI template presented to a mid-level project manager recipient of a client whose business is data driven and located solely in the USA will be significantly different then the UI template and build for the chief technical officer recipient of a client whose business has manufacturing in China, a technology team in numerous countries with data, security systems, and employees at all locations.

Figure 9:
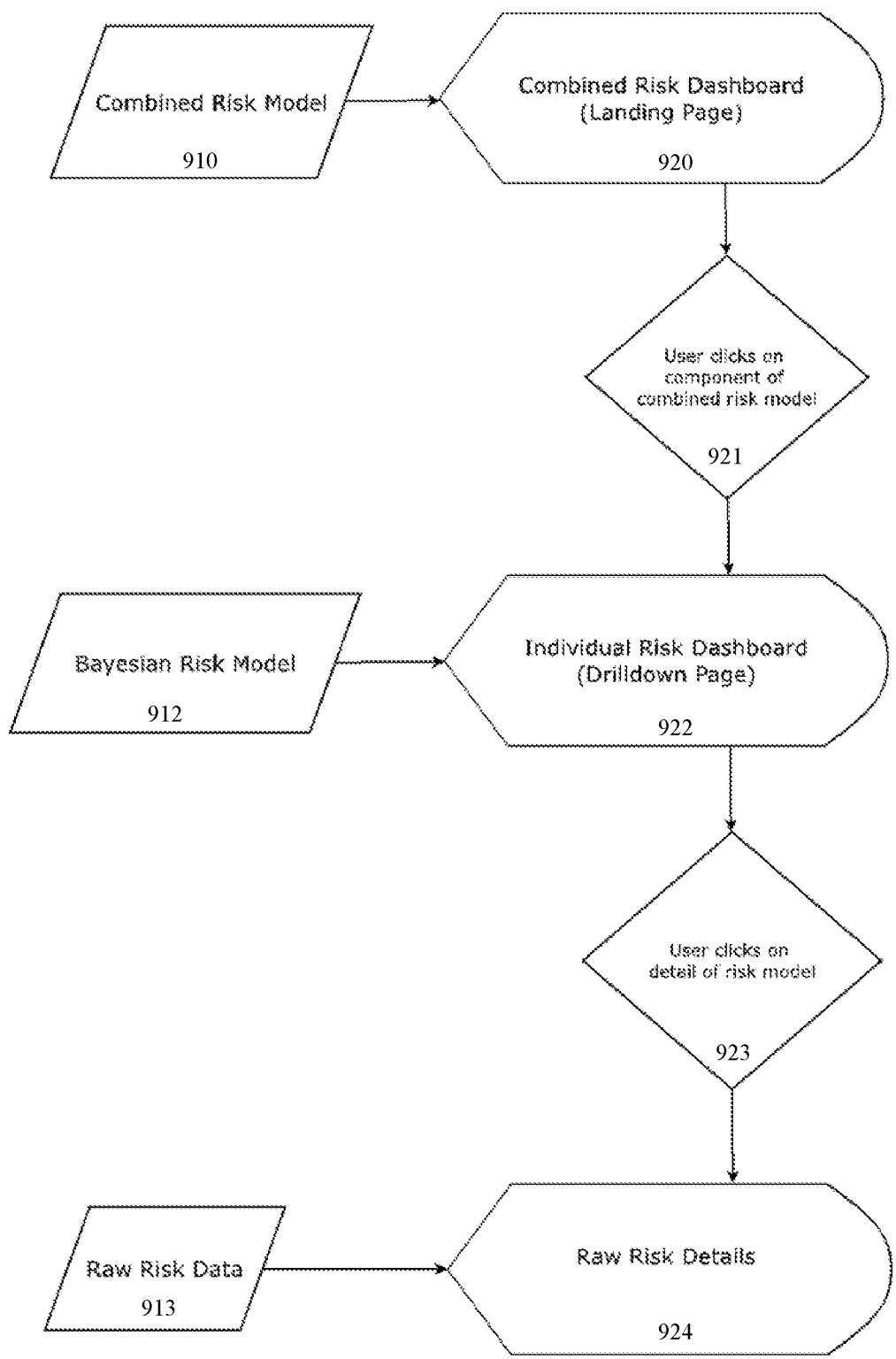
FIG. 9 is a flow diagram of the interface options.

The present invention, as seen in FIG. 9, enables a user to review the elements and modeling which form the basis of the summarized risk scores by allowing the user to dig deeper into the combined risk model 910 and individual drill downs all the way to the actual risk data. When delving into the details of the combined risk model 910, the user interface presents the user with a combined risk dashboard (landing page) 920. The user clicks on components of the combined risk model in step 921 which shows the user their individual risk dashboard (drilldown page) 922. The individual risk dashboard 922 is constructed using the Bayesian Risk Model 912. Once the user clicks on details of risk model in step 923 from the individual risk dashboard 922 the raw risk details 924 are presented to the user. The raw risk details 924 are composed of the raw risk data 913 obtained above.

Figure 10:
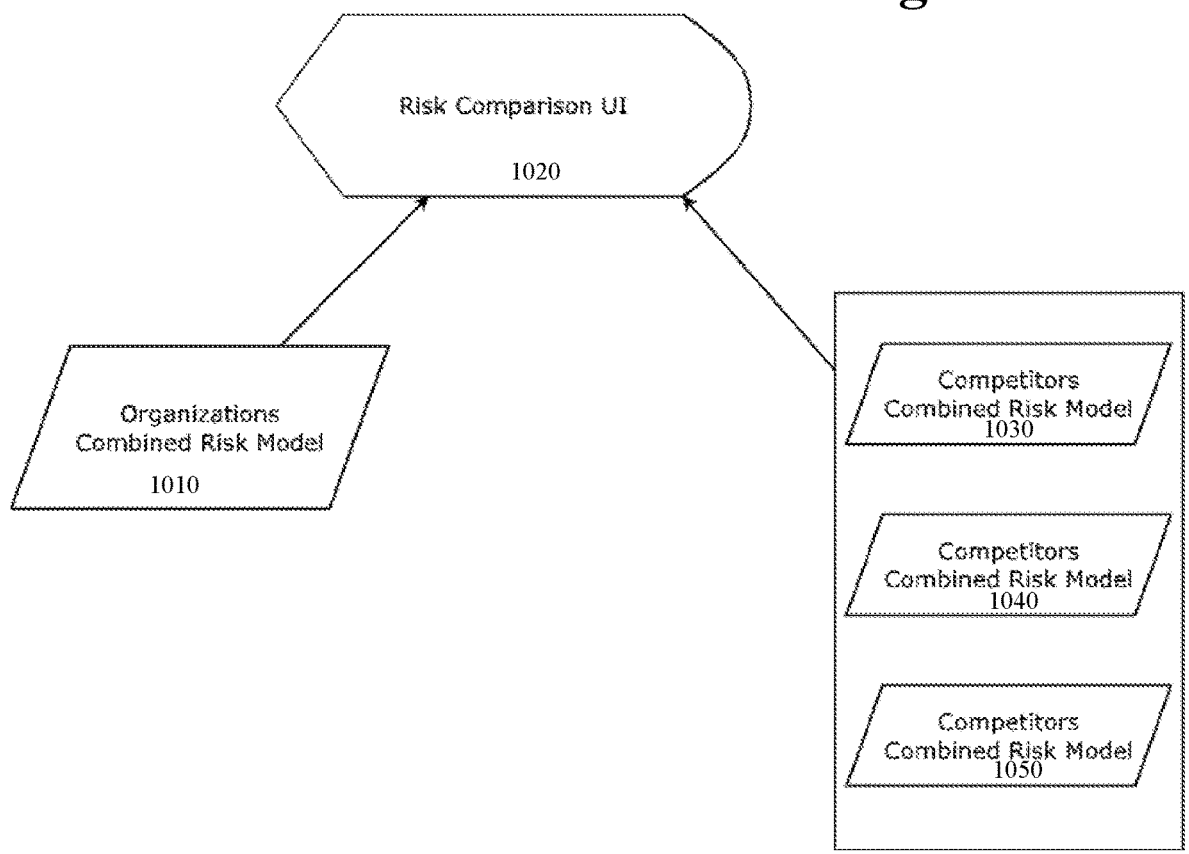
FIG. 10 is a flow diagram of the risk comparison methods.

As seen in FIG. 10, the system enables a user to perform a risk comparison UI 1020 to determine how their organizations combined risk model 1010 matches up against competitors combined risk models 1030, 1040, 1050 who have the same risk analysis and risk data. The same methodology can be performed in segmented portions of the data to compare risk within certain verticals, market segments, locations, or other segmented aspect. Note that only data available from OS INT, dark web collection, or analyst input may be available to make the comparison models.

Additionally, as more data that is added to the system, both during customer adoption and during general data collection, the global repository of raw risk data grows. This risk data can be used to build risk models on a vertical market segment basis (i.e. retail, government, banking, etc.). Then each organization in that segment can be ranked and compared against the total population of the segment, and create a template that provides the broader vertical with the composition of the lowest risk organization per vertical. This template can be applied as a basis of best case scenario that can be modeled against for customer optimization. Organizations that are customers will have a higher fidelity of data and will thus have a higher confidence level of their risk standing in their vertical.

Figure 11:
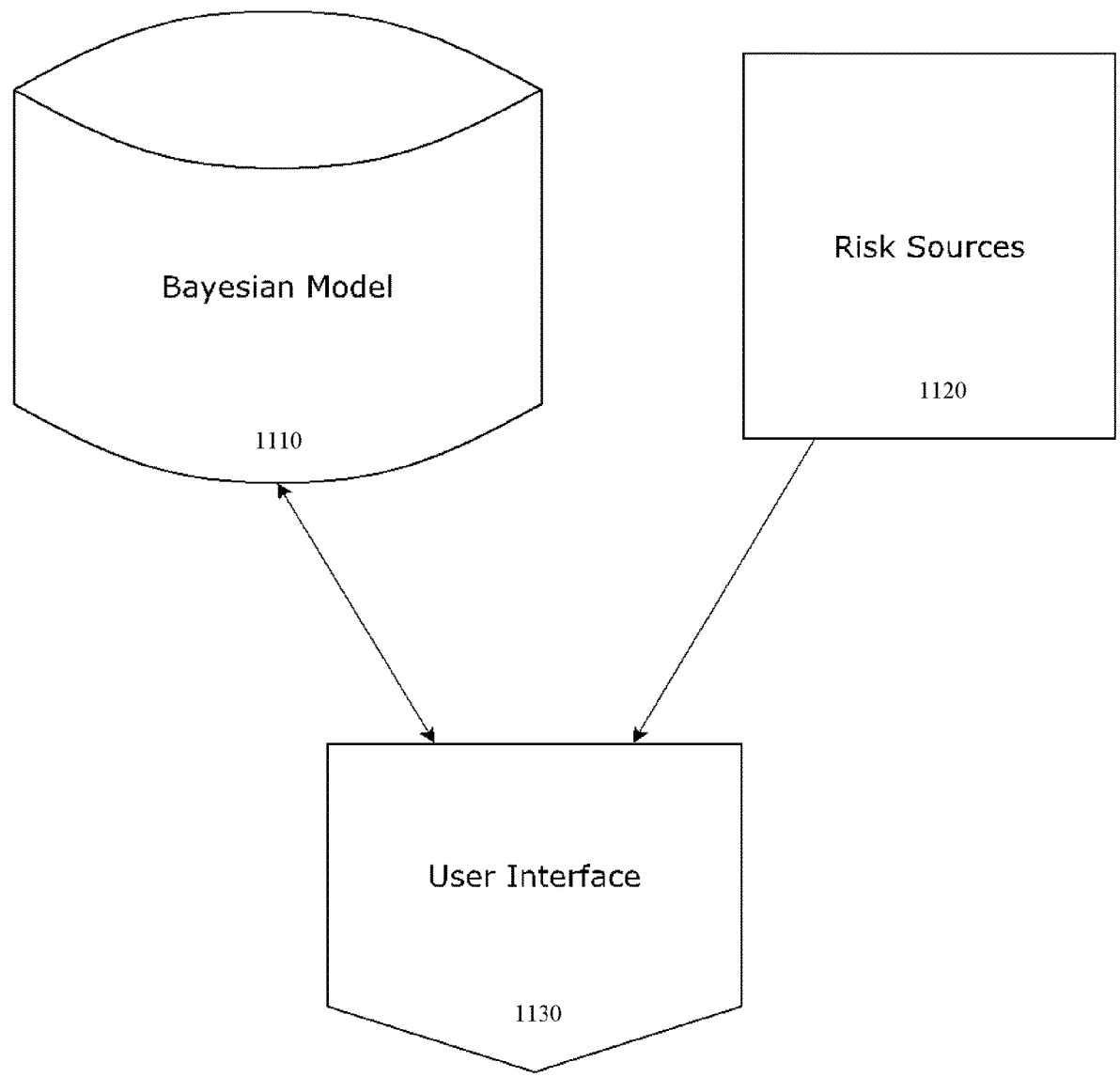
FIG. 11 is a flow diagram of the major components of the present invention.

As seen in FIG. 11, the risk sources 1120 and the Bayesian Model 1110 come together to present the user interface 1130. The user interface 1130 is determined by the risk user interface template manager and the profile manager as described above.

It is appreciated that features of one embodiment as described herein may be used in conjunction with other embodiments.

The described embodiments may be implemented as a system, method, apparatus or article of manufacture using standard programming and/or engineering techniques related to software, firmware, hardware, or any combination thereof. The described operations may be implemented as code maintained in a "computer readable medium," where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code performing features of the invention may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In embodiments of the invention, the systems and methods can be practiced using any suitable electronic device, i.e. a processing machine, which is provided with instructions to implement embodiments of the invention. An electronic device for the purpose of this invention is selected from any device capable of processing or representing data to a user and providing access to a network or any system similar to the internet, wherein the electronic device may be selected from but not limited to tablets, personal computers, mobile phones, laptops, palmtops, portable media players and personal digital assistants.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the various steps of the processes of the invention.

The processing machine used to implement the invention may utilize a suitable operating system. Thus, embodiments of the invention may include a processing machine running the Windows™ 10™ operating system, the Windows™ 8™ operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner and/or in communication with each other in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

Further, multiple applications may be utilized to perform the various processing of the invention. Such multiple applications may be on the same network or adjacent networks, and split between non-cloud hardware, including local (on-premises) computing systems, and cloud computing resources, for example. Further, the systems and methods of the invention may use IPC (interprocess communication) style communication for module level communication. Various known IPC mechanisms may be utilized in the processing of the invention including, for example, shared memory (in which processes are provided access to the same memory block in conjunction with creating a buffer, which is shared, for the processes to communicate with each other), data records accessible by multiple processes at one time, and message passing (that allows applications to communicate using message queues).

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system of networked apparatuses that provide risk model analysis and presentation of dynamic graphic user interfaces of risk, the processing being performed over a network to provide a communication interface amongst the networked apparatuses, each of the apparatuses in the form of a tangibly embodied computer processor, each computer processor including instructions on a non-transitory computer memory, the system comprising:

the network over which a plurality of networked apparatuses communicate;

a risk model analysis server, the risk model analysis server including:

a risk model processor including instructions on a non-transitory computer medium, the non-transitory computer medium constituted by one or more data storage mediums;

the risk model processor including a recipient profile manager and a recipient profile builder module which creates a real-time recipient profile using a plurality of known profile elements of recipient and filling in any profile element gaps based on the real-time risk analysis needs of the recipient, wherein the recipient profile manager selecting a first recipient profile from a plurality of recipient profiles stored in the one or more data storage mediums for a selected recipient or from the real time recipient profile created by the recipient profile builder module;

the risk model processor determining a risk model for the selected recipient profile based on a risk analysis process determined by analyzing a plurality of risk data associated with the selected recipient profile associated with the selected recipient;

the risk model processor including a user interface manager and a risk user interface builder module which creates a real-time risk user interface template using a plurality of known risk user interface elements and creating user interface elements for at least one new risk interface element based on the real-time risk analysis needs of the recipient, wherein the risk user interface manager selecting a risk user interface template from a plurality of risk user interface templates stored in the one or more data storage mediums or from the real time risk user interface template created by the risk user interface builder module based on the selected recipient profile and the risk model; and the risk model processor generating a risk graphical user interface utilizing the selected recipient profile and the selected risk user interface template and including a plurality of risk data and a plurality of risk images from the risk model;

the risk model processor initiating a communication including the risk graphical user interface to at least one recipient device associated with the selected recipient; and the at least one recipient device displaying the risk graphical user interface on a display of the recipient device.

2. The system of networked apparatuses of claim 1, the recipient profile builder module creating a new recipient profile when the risk model associated with the recipient indicates one or more traits are inconsistent with the plurality of recipient profiles stored on the data storage mediums.

3. The system of networked apparatuses of claim 1, the risk user interface builder module creating a new user interface template when the risk model associated with the selected recipient profile is inconsistent with the user interface templates stored on the data storage medium.

\* \* \* \* \*